May 23, 1950      A. L. FACCOU      2,509,090
PACKED ANTIFRICTION SWIVEL CONNECTION
Filed Sept. 29, 1947
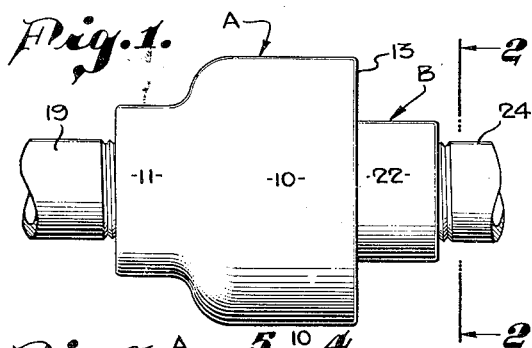
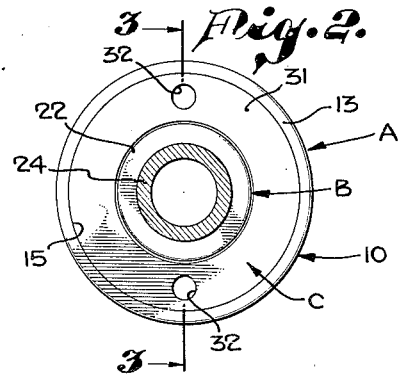
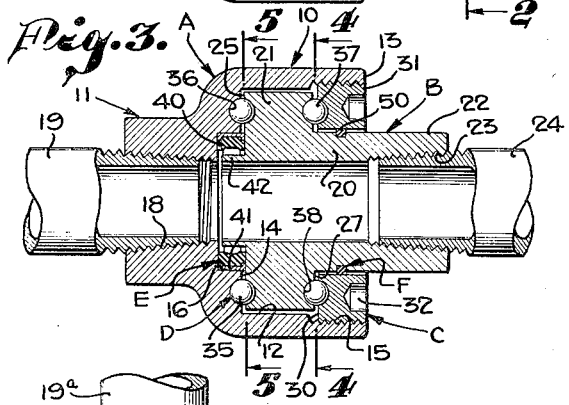
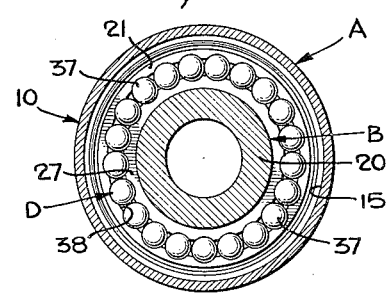
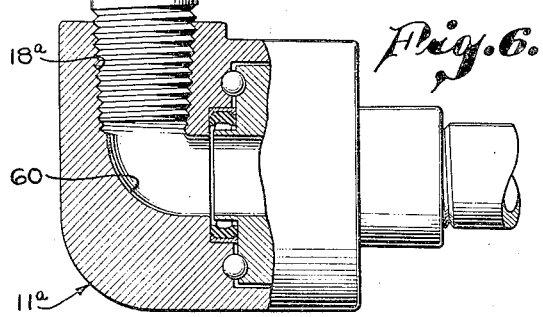
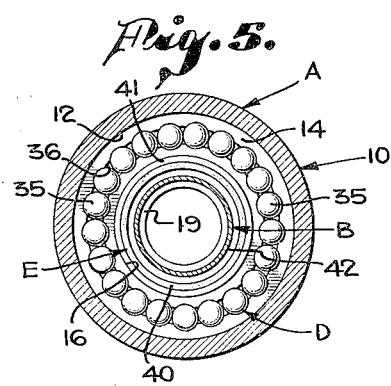
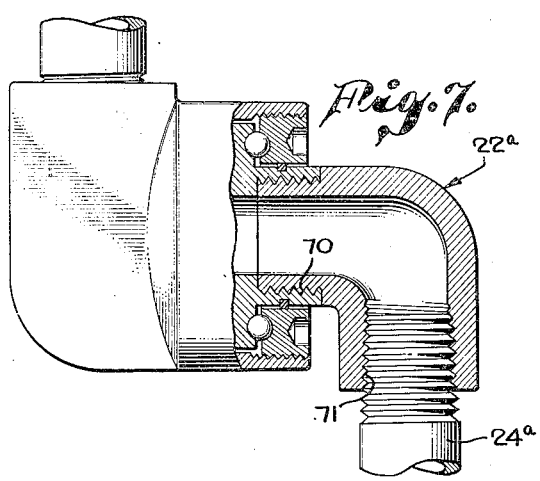
INVENTOR
ARMAND LYKKE FACCOU
BY
ATTORNEY Patented May 23, 1950

2,509,090

UNITED STATES PATENT OFFICE 2,509,090

PACKED ANTIFRICTION SWIVEL CONNECTION

Armand Lykke Faccou, Santa Ana, Calif., assignor to Chiksan Company, Brea, Calif., a corporation of California Application September 29, 1947, Serial No. 776,679

2 Claims. (Cl. 285—97.3)

1

This invention relates to a packed anti-friction swivel connection, and it is a general object of the invention to provide such a connection wherein there are few, simple, dependable parts.

Swivel connections for handling fluid are required in places where it is advantageous that such connections work freely and in some cases such connections are subject to both axial and radial thrust making adequate bearing means essential for dependable service.

It is a general object of my present invention to provide a swivel connection for handling fluid which connection involves anti-friction means serving to centralize or maintain the connected elements in proper alignment and serviceable to withstand both radial and axial thrust.

A further object of the present invention is to provide a swivel connection of the general character referred to including a core operating within a case, which core is characterized by an enlargement or head, the end faces of which are grooved to carry anti-friction ball bearings.

It is a further object of this invention to provide a construction of the general character referred to wherein provision is made for adequate sealing means to prevent leakage of fluid to the bearings and wherein a seal is provided preventing dust or foreign matter from entering the structure to reach the bearings.

The various objects and features of my invention will be fully understood from the following detailed description of typical preferred forms and applications of the invention, throughout which description reference is made to the accompanying drawings, in which:

Fig. 1 is a side elevation of a swivel connection embodying the present invention showing it applied to aligned fluid conduits. Fig. 2 is a view taken substantially as indicated by line 2—2 on Fig. 1. Fig. 3 is a longitudinal sectional view of the structure taken as indicated by line 3—3 on Fig. 2. Fig. 4 is a transverse sectional view taken as indicated by line 4—4 on Fig. 3. Fig. 5 is a transverse sectional view taken as indicated by line 5—5 on Fig. 3. Fig. 6 is a view showing a modified form of my invention with parts broken away to show in section, and Fig. 7 is a view showing a further modified form of the invention with parts broken away to show in section.

Referring first to the form of the invention illustrated in Figs. 1 to 5, inclusive, the structure involves generally a body A, a core B, a closure C for the body, bearing means D supporting the core with the body, a main sealing means E and an outer or supplemental seal F.

2

The body A is a tubular unit involving, generally, a case portion 10 and a projecting coupling portion 11. The case 10 is shown substantially larger in diameter than the coupling 11 and is integrally joined thereto, the two parts forming an aligned assembly or unit. A bore 12 enters the case from its outer end 13 and terminates in a flat bottom 14 in the case. The outer end portion 15 of the bore 12 is somewhat enlarged and is threaded as shown in Fig. 3 of the drawings. A reduced counterbore 16 is provided in the body extending inward from the bottom 14, the counterbore being considerably smaller than the bore 12 so that it is confined to the central portion of the case. The coupling part 11 has an opening 18 continuous with the opening through the case 10, the opening 18 being shown threaded to receive a pipe 19 or the like.

The core B is a tubular member or element with a spindle portion 20 and an enlargement or head 21 on the inner end of the spindle. An outer or projecting end portion 22 of the spindle forms a coupling part and in the case illustrated it is shown internally threaded at 23 to receive a pipe 24 or the like. The head 21 has a flat inner end 25 opposing the bottom 14 and the counterbored portion 16 and it has a flat outer end 27 facing outward in the case. The ends 25 and 27 of the head are co-planar and are normal to the longitudinal axis of the structure.

The closure C that I provide is a simple annular part or ring in the nature of a retainer having its outer peripheral portion threaded to be engaged in the threaded opening 15 in the case. The retainer has a flat inner end face 30 opposing the outer end face 27 of the head 21. When the retainer is in position its outer end 31 may be substantially flush with the end 13 of the case and, as shown in the drawings, it is provided with parts engageable by means of a suitable wrench or the like. In the particular case illustrated wrench sockets 32 are provided in the end 31 of the retainer.

The bearing means D that I provide involves an inner row of ball bearings 35 carried in registering annular grooves 36 in the bottom 14 and the inner end 25 of the case and the head, respectively, and an outer row of ball bearings 37 carried in registering annular grooves 38 in the outer side 27 of the head and the inner side 30 of the retainer. The row of balls 35 is outward of and surrounds the counterbore 16 and it is preferred that the two rows of balls be of the same diameter as shown in the drawings.

The main seal or packing means E involves a packing unit of suitable construction and formation located in the counterbore 16 between the inner end 25 of the head and the bottom of the counterbore. The packing asembly may include a suitable sealing or lip ring 40 and a ring retainer 41. In the construction illustrated the core B has a central collar-like extension 42 projecting beyond the inner end of the head and within the packing to serve as a protection for the packing.

The outer seal F is provided between the spindle 20 and the retainer C and it may be a simple annular sealing ring 50 carried in a groove in the exterior of the spindle to operate within the annular retainer.

In the form of the invention shown in Fig. 6 the coupling part 11ª instead of being in the form of a reduced extension co-axial with the case of the body is an extension or enlargement of the case with a lateral threaded opening 18ª joined to the opening in the case by a suitable curved neck 60. In this case a pipe 19ª or the like may be connected to the fitting to extend laterally therefrom. In other particulars the structure may be the same as that hereinabove described.

In the form of the invention shown in Fig. 7 the structure is the same as that illustrated in Fig. 6, except that the coupling part 22ª instead of being a simple continuation of the spindle is in the nature of an L-fitting threaded into a central threaded opening 70 in the end of the spindle and having a lateral threaded opening 71 receiving a pipe 24ª or the like, so that the pipe extends laterally of the pivotal axis of the fitting.

From the foregoing description it will be apparent that I have provided a very simple, inexpensive construction providing adequate bearing engagement between the relatively rotatable parts and that the construction incorporates suitable sealing means so that the bearings do not become fouled or contaminated. The construction is free of undesirable or cumbersome projections and the assembly is under full control of the single annular retainer which, when applied as shown throughout the drawings, holds the various parts in working position.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A swivel connection of the character described including, a one piece body having a cylindrical case and a coupling at one end of the case communicating with the case and having a wall forming a bottom at said end of the case, a tubular core extending into the case and having a spindle portion projecting from the case at the other end thereof, and having an enlargement in the form of a head on the core closely adjacent the inner end of the core and fitting in the case with working clearance, an annular retainer threaded in the other end of the case, an annular row of ball bearings between the bottom of the case and one end of the head, an annular row of ball bearings between the other end of the head and the retainer, and a substantially rigid annular packing means between the body and the inner end of the core and sealing against the core axially thereof, the packing means being smaller in diameter than the first mentioned row of bearings and engaging the core radially inward of the said first mentioned row of bearings.

2. In a swivel connection having a one piece body with a cylindrical base, a coupling at one end of the case communicating therewith, and having a wall forming a bottom at said end of the case, and having a tubular core extending into the case with a spindle portion projecting from the other end of the case and with a head at its inner end portion fitting in the case with working clearance, and having an annular retainer threaded in the said other end of the case, and having an annular row of ball bearings between the head and retainer, an annular row of ball bearings acting betwen said wall and said head and a substantially rigid annular sealing means smaller in diameter than the last mentioned row of bearings and acting between the body and core and sealing axially against the core radially inward of the said last mentioned row of bearings.

ARMAND LYKKE FACCOU.

REFERENCES CITED

The following references are of record in the file of this patent:

UNITED STATES PATENTS

| Number | Name | Date |
| --- | --- | --- |
| 929,734 | Walder | Aug. 13, 1909 |
| 2,382,375 | Allen | Aug. 14, 1945 |
| 2,414,997 | Atkins | Jan. 28, 1947 |